Figure 1:
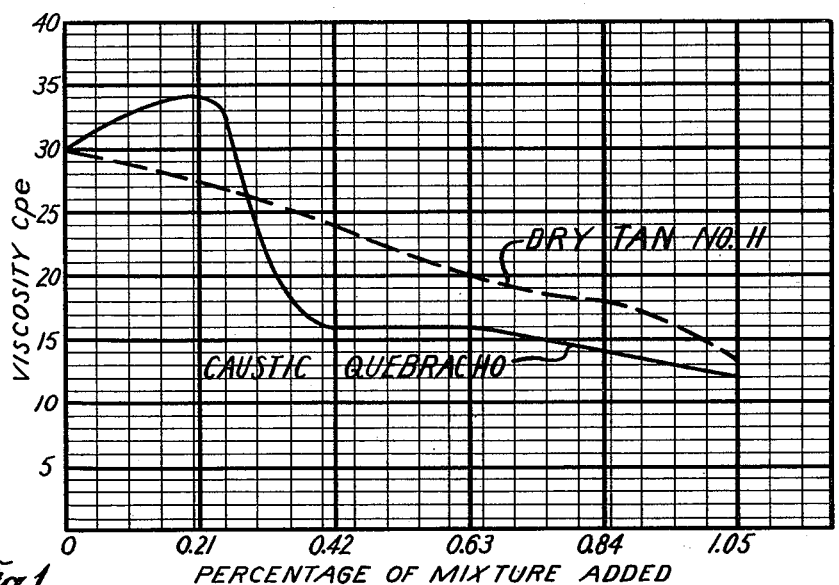
Figure 2:
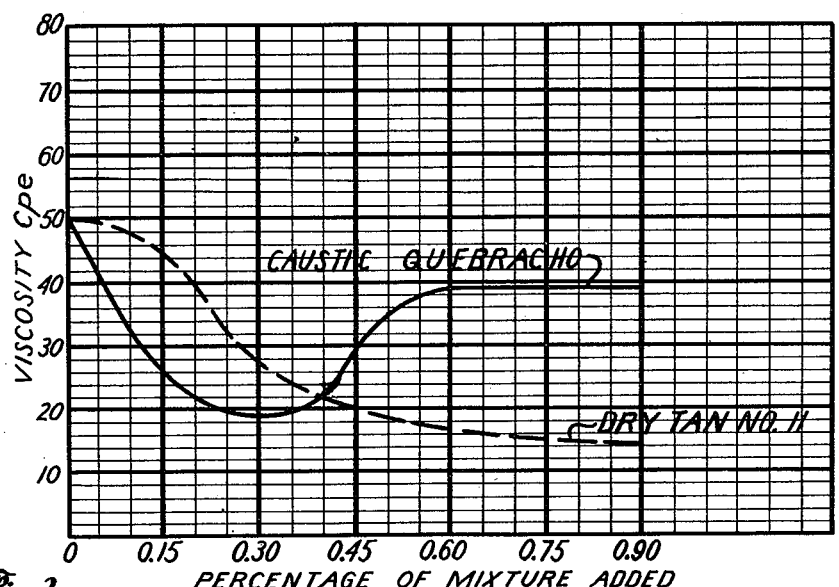

Nash O. Campise
INVENTOR

Nash O. Campise
INVENTOR

BY James F. Weiler
ATTORNEY

Nash O. Campise
INVENTOR

Patented July 17, 1951

2,560,930

UNITED STATES PATENT OFFICE 2,560,930

MIXTURE FOR CONTROLLING PROPERTIES OF DRILL FLUIDS

Nash O. Campise, Houston, Tex., assignor to Houston Oil Field Material Company, Inc., Houston, Tex., a corporation of Delaware Application August 23, 1948, Serial No. 45,676

6 Claims. (Cl. 252—8.5)

This invention relates to mixtures used for the treatment of drilling fluids and relates particularly to a composition of and a method of forming an alkaline organic salt for such use.

The use of drilling fluids and muds in various drilling operations is well known in the art. Typical fluids used are water based muds, such as water based with clay, bentonites and weighting materials; oil emulsion type muds wherein approximately 20 per cent of the volume of water is replaced with oil; and oil base muds wherein oil is substituted for water. The present invention is adapted for treatment of water based and oil emulsion type muds, the oil base mud being substantially inert.

Included among the functions of drilling fluids and muds is the lifting of cuttings by virtue of proper viscosity and proper gel strength and the forming of a tough filter cake on the walls of the bore hole to prevent, as far as possible, large amounts of water from entering the formation being drilled. These drill fluids and muds are subject to considerable contamination by the various salts and clays present in the formations being drilled. A large percentage of this contamination may increase either the viscosity or water loss into the formation or both, the latter increase being due to the decrease in effective wall building properties of the mud.

In the art a wide variety of chemicals have been used for the reduction of viscosity of drilling fluids, the most common of which are phosphates and certain tree extracts which for the most part are combined with an alkaline material. Sodium tannate has long been used for controlling viscosity and improving the plasticity and wall building properties of such fluids. Customarily, sodium tannate is formed at the well by physically mixing either flake or liquid caustic soda with an extract such as quebracho, which has been most commonly used. Any desired ratio of caustic to quebracho may be used, the required ratio being determined by pilot tests on the mud in question.

The use of the mixtures of the prior art involves considerable loss of materials and deterioration resulting in less efficient results due primarily to the hygroscopicity of caustic soda. Further, the handling of flake or concentrated liquid soda is dangerous and expensive due to its corrosive and hygroscopic properties and involves the use of expensive and strong metal containers. Additionally, some of the wood extracts when stored for any length of time will set to a hardened mass and regrinding becomes necessary. Furthermore, in the use of mixtures of caustic and quebracho a substantially constant decrease in viscosity is not obtained, and when certain amounts of such mixtures are added, the viscosity is increased or has little effect rather than to decrease the viscosity as intended.

It is among the objects of my invention to provide a mixture which may be packaged in paper sacks, which will not deteriorate and which requires no regrinding of the constituent parts.

It is a particular object to provide a mixture which is cheaply and easily manufactured and which is more effective than those of the prior art.

It is a further and particular object to provide a mixture in which all of the initial constituents play an active and effective part in its action on the drill fluid.

It is a particular object to provide a mixture which will effectively decrease the viscosity as it is added to the drill fluid and will not increase the viscosity or be of little effect in controlling viscosity in certain percentage ranges.

Broadly my invention comprises mixing substantially molecular equivalents of an alkaline carbonate such as sodium carbonate and hydrated alkaline earth such as lime with any desired amount of an organic compound such as wood or vegetable extract which need not be pure. Any of the following commercial extracts may be used:

| | |
|---|---|
| Quebracho | Myrabolam |
| Archil | Oak |
| Cutch | Osage |
| Divi-divi | Orange |
| Fustic | Quercitron |
| Gambier | Redwood |
| Haematine | Spruce |
| Hemlock | Sumac |
| Hypernic | Wattle bark |
| Logwood | |

Of this group quebracho is preferred. Other organic compounds which may be used are tannic acid, humic acid, pyrogallic acid, gallic acid, sugar, starch or the like. Any desired amount of vegetable extract or organic compound may be used and the mixture when placed in an aqueous solution, will result in the desired ratio of alkali to extract.

In the accompanying drawings the curves illustrate the viscosity decrease in using similar mixtures of my invention and the conventional mixtures of caustic alkali and quebracho, and the figure numbers are the same as the table numbers from which the data is used to plot the curves.

By way of specific example, 46.3 pounds of lime and 66.3 pounds of sodium carbonate were mixed with 50 pounds of quebracho. When this mixture was placed in an aqueous solution a sodium tannate solution was yielded with a caustic to quebracho ratio of one to one by weight. For convenience this mixture is referred to as Dry-Tan No. 11 and in the following Table I Dry-Tan No. 11 was added to drilling mud in a dry form, the mud comprising 26.3 per cent clay in water. Similar amounts of caustic to quebracho in a one to one ratio by weight were added and the results noted as in Table I.

Table I

| Percentage Dry-Tan 11 | Viscosity, cpe. | Zero Gel, grams | pH |
|---|---|---|---|
| 0 | 30 | 25 | 7.5 |
| 0.21 | 27.5 | 15 | 9.8 |
| 0.42 | 24 | 10 | 10.2 |
| 0.63 | 20 | 10 | 10.81 |
| 0.84 | 18 | 7 | 11.16 |
| 1.05 | 13.6 | 5 | 11.7 |

30 minute water loss at 100 p. s. i. pressure of the original mud was 6.8 cc.
Water loss fully treated with Dry-Tan No. 11 was 5.1 cc.

| Percentage Caustic-Quebracho | Viscosity, cpe. | Zero Gel, grams | pH |
|---|---|---|---|
| 0 | 30 | 25 | 7.5 |
| 0.21 | 34 | 20 | 10.02 |
| 0.42 | 16 | 10 | 10.9 |
| 0.63 | 16 | 10 | 11.39 |
| 0.84 | 14 | 7 | 11.73 |
| 1.05 | 12 | 5 | 12.2 |

Original water loss, 6.8 cc.
Water loss, fully treated, 5.6 cc.

Table I illustrates the effect of Dry-Tan 11 when added in powdered form into a conventional drilling fluid consisting of water and clay. The viscosity was reduced from 30 centipoises (cpe.) to 13.6 cpe. and was measured on the Stormer viscosimeter at 600 R. P. M. The improvement in wall building properties was evidenced by the reduction in water loss from 6.8 cc. to 5.1 cc. in thirty minutes time at 100 p. s. i. In comparing the effect of Dry-Tan 11 and the mixture of caustic and quebracho it was noted that the viscosity reduction with the use of Dry-Tan 11 was substantially more constant than that when caustic and quebracho were used. This effect is graphically brought out in the curve indicated at Figure 1 wherein viscosity in cpe. at 600 R. P. M. is plotted against the percentage of chemical added to the mud.

In Table Number II Dry-Tan 11 was added in a ten per cent aqueous solution to a drilling mud comprising water and 8.44 per cent bentonite.

Table II

| Dry-Tan No. 11, percentage | Viscosity, cpe. | Zero Gel, grams | pH |
|---|---|---|---|
| Untreated | 50 | 65 | 7.5 |
| 0.15 | 45 | 25 | 8.9 |
| 0.30 | 22 | 5 | 10.4 |
| 0.60 | 17 | 5 | 10.9 |
| 0.90 | 14.5 | 5 | 11.5 |

Original water loss, 15 min. at 100 p. s. i. was 9.0 cc.
Water loss, fully treated, 15 min., 100 p. s. i. was 6.2 cc.

| Caustic-Quebracho percentage | Viscosity, cpe. | Zero Gel, grams | pH |
|---|---|---|---|
| Untreated | 50 | 65 | 7.5 |
| 0.15 | 25 | 10 | 10.3 |
| 0.30 | 18 | 5 | 10.9 |
| 0.60 | 39 | 5 | 11.8 |
| 0.90 | 39 | 5 | 12.3 |

Original water loss, 15 min. at 100 p. s. i. was 9.0.
Water loss, fully treated, 15 min. at 100 p. s. i. was 6.4.

Table Number II illustrates the effect of adding Dry-Tan No. 11 in a ten per cent aqueous solution. The viscosity of the drilling fluid was reduced from 50 cpe. to 14.5 cpe., the gel strength was reduced from 65 to 5 grams and the water loss from 9 cc. to 6.2 cc. in 15 minutes at 100 p. s. i. Contrasting the caustic to quebracho in the same proportions as Dry-Tan 11 added to the same drilling mud in a ten per cent aqueous solution it was noted that the viscosity of the drilling mud increases when .60 and .90 per cent of caustic and quebracho is added. This is graphically brought out in curve number 2.

In Table Number III Dry-Tan No. 11 and caustic alkali and quebracho were added to water before the 8.44 per cent bentonite was mixed with the water.

Table III

| Dry-Tan added, percentage | Viscosity, cpe. | Gel, Zero, grams | pH |
|---|---|---|---|
| Untreated | 50 | 65 | 7.5 |
| 0.15 | 32 | 25 | 9.5 |
| 0.30 | 22 | 5 | 10.3 |
| 0.60 | 13.6 | 5 | 11.1 |
| 0.90 | 10 | 5 | 11.5 |

Original water loss, 30 min. at 100 p. s. i. was 13.5.
Water loss, fully treated, 30 min. at 100 p. s. i. was 9.4.

| Caustic-Quebracho percentage | Viscosity, cpe. | Zero Gel, grams | pH |
|---|---|---|---|
| Untreated | 50 | 65 | 7.5 |
| 0.15 | 31 | 10 | 10.3 |
| 0.30 | 18 | 5 | 10.9 |
| 0.60 | 20 | 5 | 12.05 |
| 0.90 | 12 | 5 | 12.3 |

Original water loss, 30 min. at 100 p. s. i. was 13.5.
Water loss, fully treated, 30 min. at 100 p. s. i. was 10.2.

Figure 3:
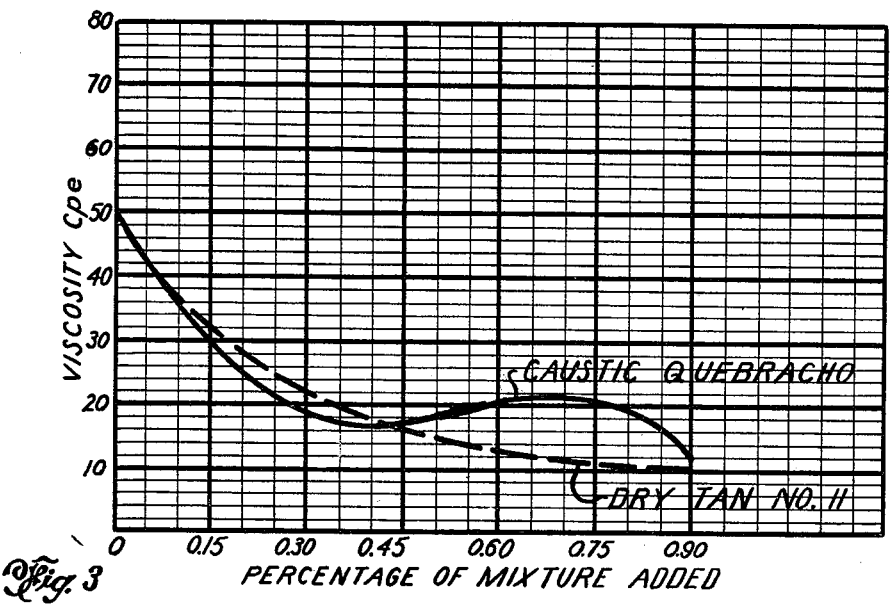

Table III illustrates the beneficial effect of Dry-Tan 11 when added to water prior to the addition of the bentonite. The viscosity reduction was from 50 cpe. to 10 cpe. and the water loss was from 13.5 cc. to 9.4 cc. Contrasting the addition of caustic and quebracho to water before the bentonite was added it was seen that the viscosity reduction was not as constant as that when Dry-Tan 11 is added. Again this is graphically brought out by the curve of Figure 3.

In Table Number IV the component parts of Dry-Tan 11 were separately weighed and added individually to a drilling mud made up of water and 8.44 per cent bentonite. Caustic alkali and quebracho were added to a like drilling mud in a similar manner.

Table IV

| Dry-Tan 11 added, percentage | Viscosity, cpe. | Zero Gel, grams | pH |
|---|---|---|---|
| Untreated | 50 | 65 | 7.5 |
| 0.45 | 27.5 | 7 | 10.77 |
| 0.90 | 19 | 5 | 11.79 |
| 1.35 | 18 | 4 | 12.28 |
| 1.80 | 4 | 0 | 12.4 |

Original water loss, 30 min. at 100 p. s. i. was 13.2.
Water loss, fully treated, 30 min. at 100 p. s. i. was 10.

| Caustic-Quebracho, percentage | Viscosity, cpe. | Zero Gel, grams | pH |
|---|---|---|---|
| Untreated | 50 | 65 | 7.5 |
| 0.29 | 27 | 7 | 11.1 |
| 0.58 | 29.5 | 5 | 11.96 |
| 0.87 | 29.5 | 5 | 12.31 |
| 1.16 | 23 | 5 | 12.52 |

Original water loss, 30 min. at 100 p. s. i. was 13.2.
Water loss, fully treated, 30 min. at 100 p. s. i. was 9.4.

Figure 4:
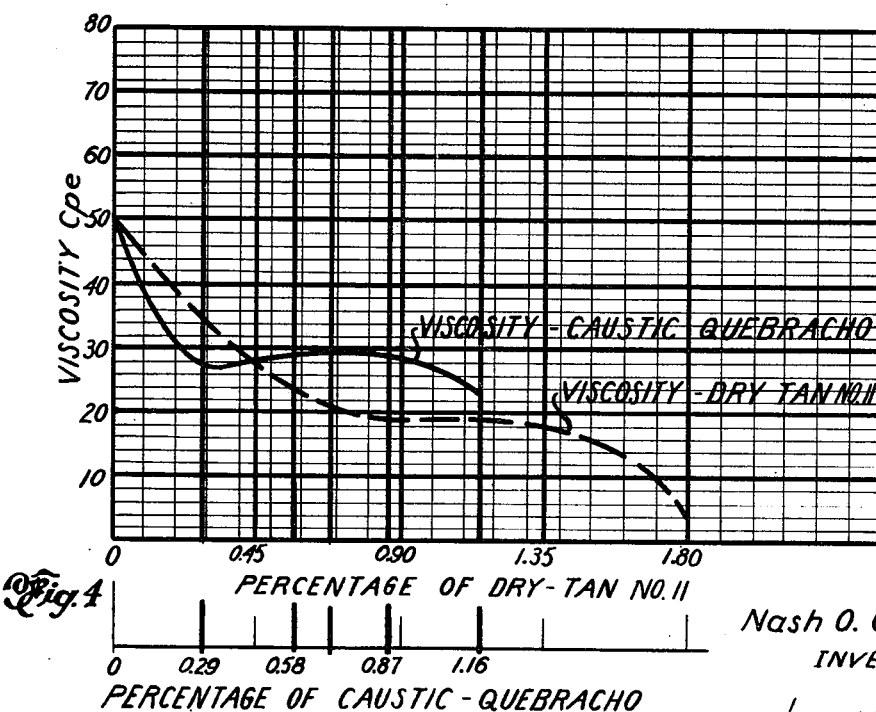
Figure 5:
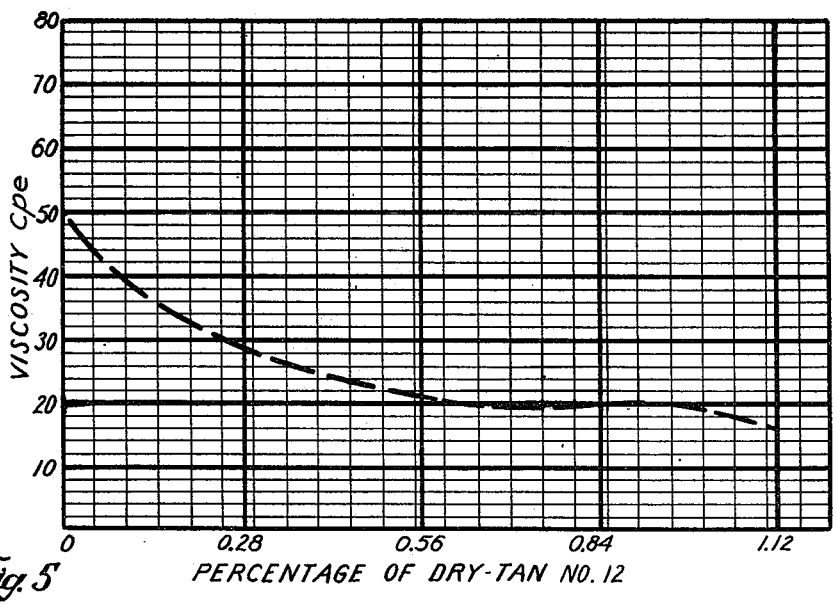

From Table IV it is seen that when the components of Dry-Tan 11 are weighed and added individually to a drilling mud, the viscosity reduction was from 50 cpe. to 4 cpe. and the water loss reduction was from 13.2 cc. to 10 cc. Again there was a more constant reduction in viscosity in Dry-Tan 11 than when caustic and quebracho were separately weighed and added. This again is graphically borne out by the curve of Figure 4.

By way of further example, 46.3 pounds of lime and 66.3 pounds of sodium carbonate were mixed with 100 pounds of quebracho which when introduced into an aqueous solution yielded a sodium tannate solution with a ratio by weight of caustic alkali to quebracho of one to two, which for convenience is herein referred to as Dry-Tan No. 12.

The following tables illustrate the beneficial effects of Dry-Tan 12 on various types of muds. The mud used in Table V was a water-bentonite mud comprising 8.44 per cent bentonite.

Table V

| Dry-Tan 12 added, percentage | Viscosity, cpe. | Zero Gel, grams | pH |
|---|---|---|---|
| Untreated | 50 | 65 | 7.5 |
| 0.28 | 29 | 7 | 9.56 |
| 0.56 | 21.6 | 5 | 10.31 |
| 0.84 | 20 | 4 | 10.75 |
| 1.12 | 16 | 4 | 11.13 |

Original water loss, 30 min. at 100 p. s. i. was 13.2.
Water loss, fully treated, 30 min. at 100 p. s. i. was 8.8.

With the use of Dry-Tan Number 12 viscosity was reduced from 50 cpe. to 16 cpe. and water loss was reduced from 13.2 cc. to 8.8 cc. at 30 minutes at 100 p. s. i. Figure V shows a smooth curve with respect to viscosity decrease as the percentage of Dry-Tan 12 is increased.

In Table Number VI a drilling fluid comprising 6.64 per cent clay and 6.64 per cent bentonite was used. Dry-Tan No. 12 was employed in this experiment and the following results obtained.

Table VI

| Dry-Tan 12 added, percentage | Viscosity, cpe. | Zero Gel, grams | pH |
|---|---|---|---|
| Untreated | 73.5 | 90 | 8 |
| 0.27 | 58 | 25 | 9.97 |
| 0.54 | 37 | 10 | 10.82 |
| 0.81 | 24.5 | 5 | 11.5 |
| 1.08 | 18 | 5 | 11.94 |

Figure 6:
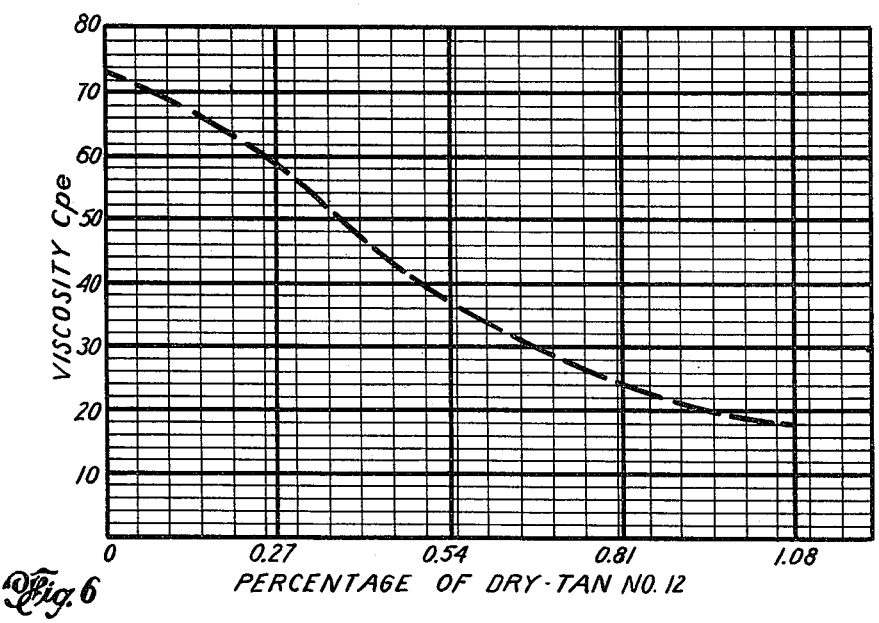

Table Number VI illustrates a reduction in viscosity from 73.5 cpe. to 18 cpe. for a clay-bentonite type mud. Figure 6 shows a smooth viscosity reduction curve by the addition of Dry-Tan No. 12.

An experiment was run on a drilling fluid consisting of 2.92 per cent clay, 4.82 per cent bentonite and 29.2 per cent barite. The results of this experiment are tabulated in Table VII.

Table VII

| Dry-Tan 12 added, percentage | Viscosity, cpe. | Zero Gel, grams | pH |
|---|---|---|---|
| Untreated | 78 | 90 | 8 |
| 0.20 | 66 | 25 | 9.24 |
| 0.40 | 57.5 | 10 | 10.03 |
| 0.60 | 50 | 5 | 10.35 |
| 0.80 | 34.5 | 5 | 10.88 |

Figure 7:
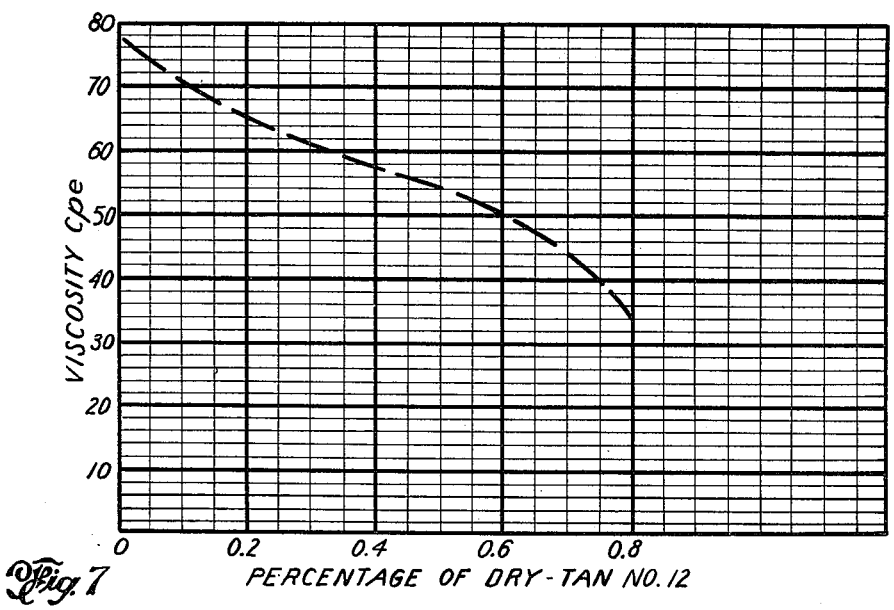

The use of Dry-Tan No. 12 on the drilling fluid used in Table VII reduced the viscosity thereof from 78 cpe. to 34.5 cpe. and the substantially constant decrease in viscosity is shown graphically by the curve of Figure 7.

By way of further example a mixture by weight of 40.6 per cent barium hydroxide, 32.8 per cent potassium carbonate and 26.6 per cent wattle bark was added to a mud comprising 8.45 per cent bentonite by weight in water. This mixture was added in the following amounts and the results tabulated in Table VIII.

Table VIII

| Chemical added, percentage | Viscosity, cpe. | Zero Gel, grams | pH |
|---|---|---|---|
| 0 | 50 | 65 | 7.5 |
| 0.28 | 22 | 10 | 9.95 |
| 0.56 | 11.8 | 5 | 10.61 |
| 0.84 | 7 | 2 | 11.14 |
| 1.12 | 5.4 | 0 | 11.62 |

Original water loss, 13.5 cc.
Water loss, treated, 11.9 cc.

It is apparent that I have invented a mixture of an alkaline carbonate and hydrated alkaline earth material having incorporated therein an organic compound such as a tree or vegetable extract, preferably quebracho, which is inexpensively and easily made, easily and cheaply handled and transported, will not deteriorate and when placed in an aqueous solution forms an alkaline organic salt that is effective and efficient to reduce viscosity, gel strength and water loss in drill fluids and muds.

I claim:
1. A mixture for treating aqueous and oil emulsion drill fluids comprising substantially equimolecular proportions of alkali metal carbonate and hydrated oxide of alkaline earth material and including an organic compound se- lected from the class consisting of vegetable tannin extract, tannic acid, humic acid, pyrogallic acid, gallic acid and quebracho extract.

2. A mixture for use in treating aqueous and oil emulsion drill fluids comprising alkaline earth oxide and dry alkali-metal carbonate in substantially equi-molecular proportions and including an organic compound selected from the class consisting of vegetable tannin extract, tannic acid, humic acid, pyrogallic acid, gallic acid and quebracho extract.

3. A mixture for treating aqueous and oil emulsion drill fluids comprising sodium carbonate and lime in substantially equi-molecular amounts and an organic compound selected from the class consisting of vegetable tannin extract, tannic acid, humic acid, pyrogallic acid, gallic acid and quebracho extract.

4. A mixture for treating aqueous and oil emulsion drill fluids comprising sodium carbonate and lime in substantially equi-molecular amounts and quebracho.

5. A mixture for treating aqueous and oil emulsion drill fluids comprising equi-molecular amounts of sodium carbonate and lime and quebracho in an amount to yield a one to one ratio by weight of quebracho to the caustic alkali formed by said sodium carbonate and lime when placed in an aqueous solution.

6. The mixture of claim 5 wherein the ratio of quebracho to caustic alkali is one to two by weight.

NASH O. CAMPISE.

REFERENCES CITED

The following references are of record in the file of this patent:

UNITED STATES PATENTS

| Number | Name | Date |
| --- | --- | --- |
| 2,109,858 | Cannon | Mar. 1, 1938 |
| 2,351,434 | Jessen et al. | June 13, 1944 |
| 2,391,622 | Dunn | Dec. 25, 1945 |